April 23, 1946.　　　A. D. SARKISIAN　　　2,398,862
LINE GUIDE FOR FISHING RODS
Filed Feb. 7, 1945
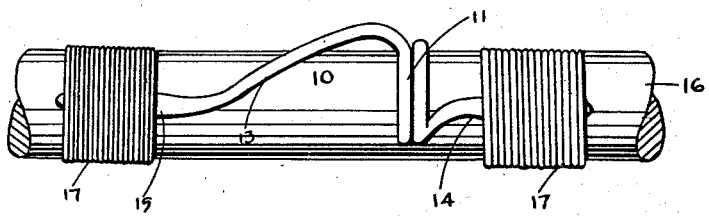
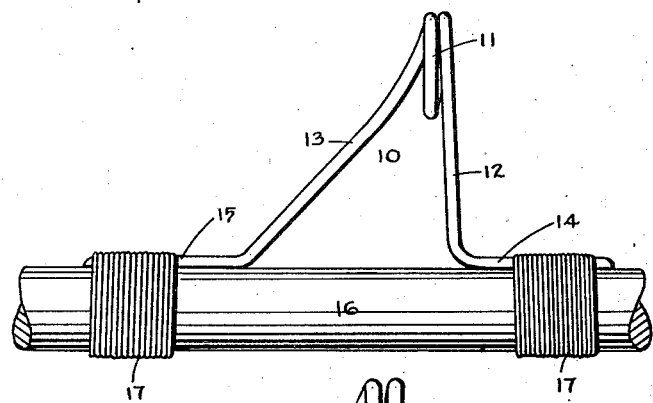
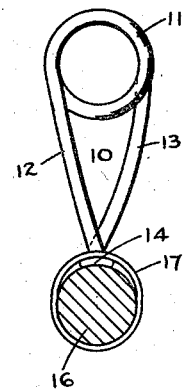
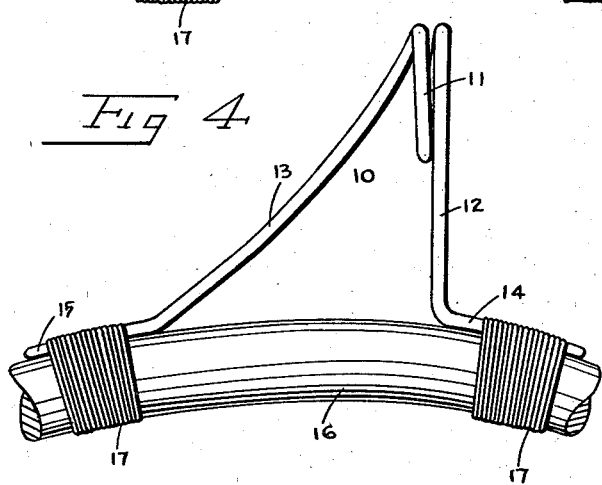
INVENTOR.
ARTHUR D. SARKISIAN
BY Jones & Roe
ATTYS.

Patented Apr. 23, 1946

2,398,862

UNITED STATES PATENT OFFICE 2,398,862

LINE GUIDE FOR FISHING RODS

Arthur D. Sarkisian, New York, N. Y.

Application February 7, 1945, Serial No. 576,569

9 Claims. (Cl. 43—24)

This invention relates to improvements in line-guides for fishing rods.

Line-guides have heretofore been proposed to lie in intimate contact with the rod, and to be otherwise constructed as to give rise to chafing of the line, fraying of the lappings by which the guide is attached to the rod, snarling of the line, and a general inflexibility which tends to augment the aforesaid hindrances.

The present invention eliminates the disadvantages of the conventional guide, and comprises in a broad sense, a single length of resilient metal, or the like, formed into an eyelet with a pair of diametrically opposite, relatively long, depending shanks which at their lower extremities merge into angular palms designed for attachment to a rod.

The invention is more fully described hereinafter, reference being had to the accompanying drawing, by way of example, wherein like symbols refer to corresponding parts throughout the several views.

In the drawing:

Fig. 1 is a top plan view of a fishing rod with the line-guide attached thereto.

Fig. 2 is a side elevation of the rod and guide.

Fig. 3 is an end view of the guide mounted on the rod, the latter being shown in section, and Fig. 4 is a view similar to Fig. 2 illustrating the flexing of the guide when the rod is placed under a heavy load.

Referring now to the drawing, it will be seen that the guide is constructed from a single length of resilient rod, wire, or the like, 10, of any desired gage. Just to one side of the center of the longitudinal extent of the rod, it is fashioned into substantially a double-whorl eyelet 11, having a pair of depending shanks 12—13 which merge at their lower extremities into palms 14—15. Forward shank 12 is slightly inclined with respect to the axis of eyelet 11, while rear shank 13 is somewhat longer and is disposed at a considerably greater angle relative said eyelet. Moreover, the forward shank is straight and the rear shank is curved laterally whereby the palms are brought into longitudinal alinement on the periphery of the pole or rod 16, and secured at these points by lappings of waxed cord 17.

As illustrated in the drawing, eyelet 11 occupies a position remote from the pole 16, thereby precluding chafing of the line against the pole or fraying of the lappings 17 ordinarily due to the friction induced by the line at these points. Also, when the line has a tendency to snarl, this is dissipated by its riding over the rear inclined shank 13 and disappearing. But of the utmost importance is the inherent characteristic of the guide to bend with the pole as the latter is put under a heavy load—note spreading of the shanks and whorls, as exhibited in Fig. 4. Such action is encouraged and accelerated by the preformed inclination of the shanks.

Obviously, the guides may be manufactured from any suitable material, and in any size.

In its broader aspects my invention comprehends the employment not only of the means described, but of equivalent means for performing the recited functions. It is desired to reserve the right to effect such changes as may come fairly within the scope of the appended claims.

I claim:

1. A line-guide for a fishing pole, comprising a resilient rod, formed with an eyelet, the eyelet having a pair of oppositely disposed shanks in a plane substantially parallel with respect to the axis of the eyelet, each shank provided at its lower extremity with a palm, and one shank being at a slight angle with respect to the eyelet, while the other shank is at a greater angle relative to the eyelet.

2. A line-guide for a fishing pole, comprising an integral resilient rod, formed with an eyelet, the eyelet having a pair of oppositely disposed shanks in a plane substantially parallel with respect to the axis of the eyelet, each shank provided at its lower extremity with a palm, and one shank being at a slight angle with respect to the eyelet, while the other shank is at a greater angle relative to the eyelet.

3. A line-guide for a fishing pole, comprising a resilient rod, formed with an eyelet, the eyelet having a pair of oppositely disposed shanks in a plane substantially parallel with respect to the axis of the eyelet, each shank provided at its lower extremity with a palm, and one shank being substantially straight while the other shank is curved.

4. A line-guide for a fishing pole, comprising a resilient rod, formed with an eyelet, the eyelet having a pair of oppositely disposed shanks in a plane substantially parallel with respect to the axis of the eyelet, each shank provided at its lower extremity with a palm, the palms being in longitudinal alinement, and one shank being at a slight angle with respect to the eyelet, while the other shank is at a greater angle relative to the eyelet.

5. A line-guide for a fishing pole, comprising a resilient rod, formed with substantially a double whorl eyelet, the eyelet having a pair of oppositely disposed shanks in a plane substantially parallel with respect to the axis of the eyelet, each shank provided at its lower extremity with a palm, and one shank being at a slight angle with respect to the eyelet, while the other shank is at a greater angle relative to the eyelet.

6. A line-guide for a fishing rod, comprising a resilient element formed to one side of the middle of its length with an eyelet having a pair of oppositely disposed shanks in a plane substantially parallel with respect to the axis of the eyelet, each shank provided at its lower extremity with a palm, and one shank being at a slight angle with respect to the eyelet, while the other shank is at a greater angle relative to the eyelet.

7. A line-guide for a fishing pole, comprising a resilient rod, formed with an eyelet, the eyelet having a pair of oppositely disposed, relatively long shanks in a plane substantially parallel with respect to the axis of the eyelet, each shank provided at its lower extremity with a palm, and one shank being at a slight angle with respect to the eyelet, while the other shank is at a greater angle relative to the eyelet.

8. A line-guide for a fishing pole, comprising a resilient rod, formed with an eyelet, the eyelet having a pair of oppositely disposed relatively yieldable shanks of different lengths, and each shank provided with attaching means at its lower extremity.

9. A line-guide for a fishing pole, comprising a resilient rod, formed with an eyelet, the eyelet having a pair of inclined shanks, the inclination of one shank being greater than the inclination of the other shank, and each shank provided with attaching means at its lower extremity.

ARTHUR D. SARKISIAN.